(No Model.)

C. T. COLBY.
MACHINE FOR CUTTING BUTTER.

No. 588,814. Patented Aug. 24, 1897.

WITNESSES:
C. Nordfors
C. Gerst

INVENTOR
Charles T. Colby
BY
Edgar Tate & Co
ATTORNEYS

THE NORRIS PETERS CO., PHOTO-LITHO., WASHINGTON, D. C.

UNITED STATES PATENT OFFICE.

CHARLES T. COLBY, OF LOS ANGELES, CALIFORNIA, ASSIGNOR OF ONE-HALF TO JOSEPH L. POWELL, OF SAME PLACE.

MACHINE FOR CUTTING BUTTER.

SPECIFICATION forming part of Letters Patent No. 588,814, dated August 24, 1897.

Application filed April 20, 1897. Serial No. 632,993. (No model.)

*To all whom it may concern:*

Be it known that I, CHARLES T. COLBY, a citizen of the United States, residing at Los Angeles, in the county of Los Angeles and State of California, have invented certain new and useful Improvements in Machines for Cutting Butter and other Substances into Blocks or Cakes, of which the following is a full and complete specification, such as will enable those skilled in the art to which it appertains to make and use the same.

This invention relates to machines for cutting butter into small cakes or blocks such as are used in hotels, restaurants, and similar places; and the object thereof is to provide an improved machine of this class which is simple in construction and operation and by means of which butter may be cut into cakes or blocks of exactly the same form and size.

The invention is fully disclosed in the following specification, of which the accompanying drawings form a part, in which the separate parts of my improvement are designated by the same numerals of reference in each of the views, and in which—

Figure 1:
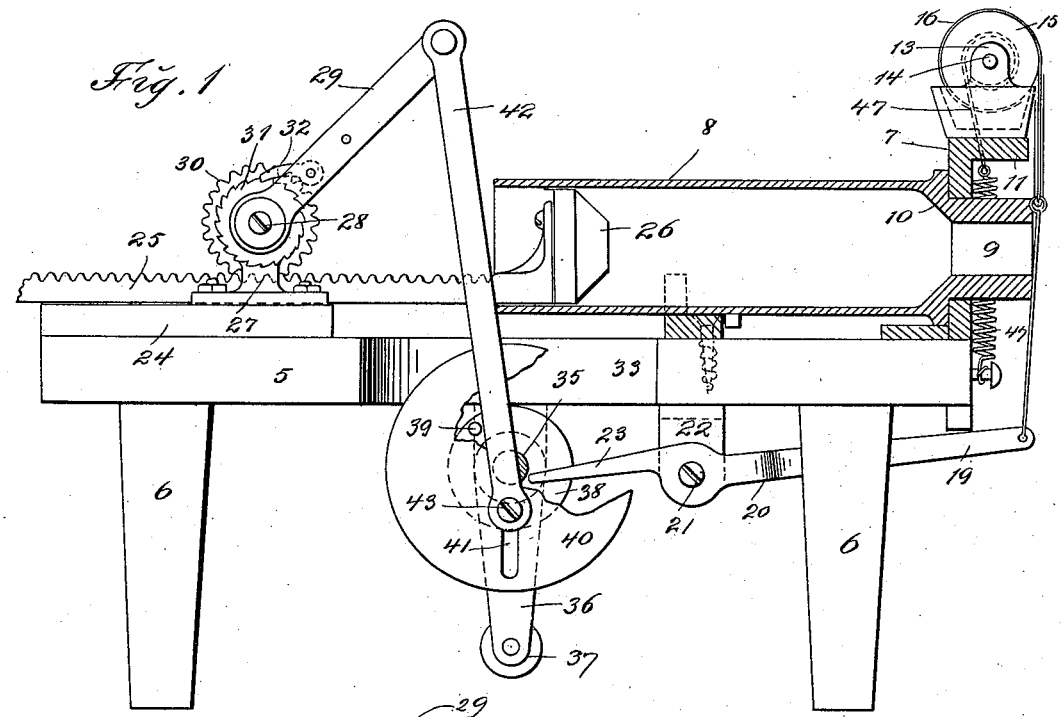
Figure 2:
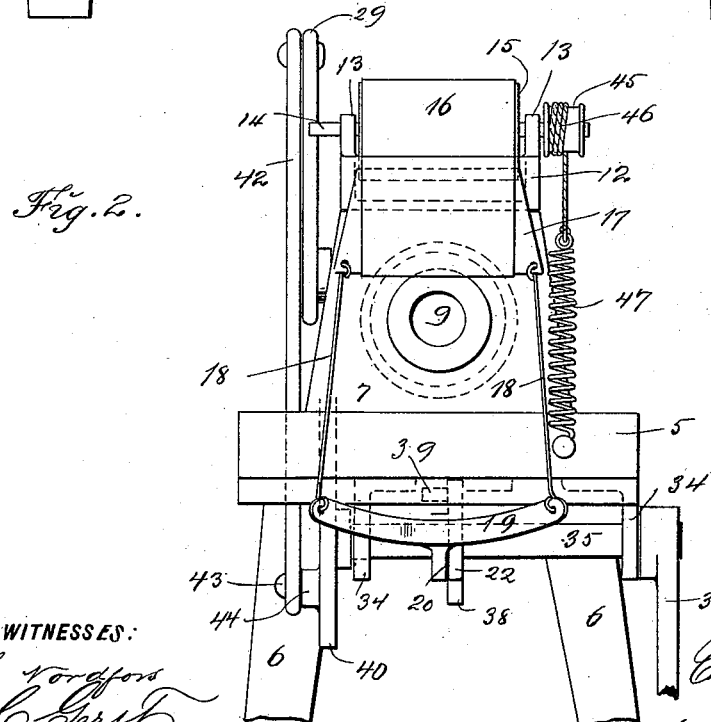

Figure 1 is a side view of my improved machine with a part of the construction broken away, and Fig. 2 an end view thereof.

In the practice of my invention I provide a base-plate 5, which is supported by legs 6, and suitably supported above the base-plate 5, at one end thereof, is an end board 7, adjacent to which and centrally of the base-plate 5 is a tubular casing 8, which is provided with a tubular extension 9, which projects centrally through the end board 7, and the inner walls of which are beveled, as shown at 10.

The end board 7 is provided with an outwardly-directed flange 11, on which is supported a suitable receptacle 12, which is provided with upwardly-directed bearings 13, in which is mounted a shaft 14, on which is placed a roller 15, and the roller 15 is provided with a strip 16 of cloth or suitable textile material, which is wound thereon, and the end of the cloth 16 is passed around a cutting-blade 17, the edge of which is directed downwardly, and said cloth is passed around the cutting edge of said blade and is connected therewith in any desired manner, and connected with the outer lower corners of the blade 17 are rods 18, the lower ends of which are connected with the sides of a yoke 19, which is provided with a lever 20, which is pivotally connected at 21 with a hanger 22 and which is provided with a backwardly-directed arm 23.

Mounted on the end of the base-plate 5, opposite the end board 7, is a block 24, the upper surface of which is parallel with the lower side of the tubular casing 8, and mounted on said block is a sliding rack-bar 25, which is provided at one end with a piston 26, and supported adjacent to the rack-bar 25 is a bearing 27, in which is mounted a shaft or bolt 28, with which is connected a crank 29, and mounted on the shaft or bolt 28 is a gear-wheel 30, which is adapted to operate in connection with the rack-bar 25, and said shaft is also provided with a ratchet-wheel 31, and pivotally connected with the crank 29 is a pawl 32, which operates in connection with the ratchet-wheel 31.

The base-plate 5 is provided centrally with an oblong opening 33, and at each side thereof are hangers 34, in which is mounted a shaft 35, which is provided at one end with a crank 36, with which is connected a handle 37.

The shaft 35 is provided centrally thereof with a wheel 38, which is provided at one side with a pin 39, which is adapted to operate the arm 23 of the yoke 19, and mounted on one end of said shaft is a larger wheel 40, in which is formed a radial slot 41, and pivotally connected with the crank 29 is a rod 42, which is connected with the wheel 40 by a pin or bolt 43, which passes through the slot 41 and which is provided with a bearing 44, which moves in said slot.

The shaft 14, on which the roller 15 is mounted, is provided at one end with a drum 45, on which is wound a cord 46, with which is connected a strong spiral spring 47, which is also connected with the end of the base-plate 5, and the operation will be readily understood from the foregoing description when taken in connection with the accompanying drawings and the following statement thereof.

The butter to be cut is placed in the tubular casing 8, and the normal position of the blade 17 is that shown in the drawings, said blade being held in this position by the spring 47, and the machine is operated by turning the crank 36. This operation of the crank 36 revolves the wheel 40 and also the wheel 38, and as the wheel 40 is revolved the upward movement of the crank-rod 42 forces the rack-bar 25 forwardly and forces the butter out through the tubular extension 9 of the tubular casing 8, and as the wheel 38 revolves the pin 39 strikes the inner end of the arm 23 of the yoke 19 and draws down the blade 17 and cuts off the butter at the end of the tubular extension 9. The spring 47 at once returns the cutting-blade 17 to its normal position, and in the downward movement of the crank-rod 42 the pawl 32 passes over the ratchet-wheel 31 and the rack-bar 25 remains stationary.

It will thus be seen that at each revolution of the crank 36 the rack-bar 25 is forced forwardly a predetermined distance and a predetermined amount of the butter is cut off at the end of the extension 9 of the cylindrical casing 8.

The receptacle 12 is filled with water, and the roller 15 projects downwardly thereinto, and the cloth which is wound on said roller and with which the blade 17 is connected passes through the water and is kept saturated thereby, and thus prevents the butter or other substances from adhering to said cloth and said blade.

This device is simple in construction and operation, and it will be apparent that lard and other substances may be cut into cakes or blocks in the same manner, and it will also be apparent that changes in and modifications of the construction herein described may be made without departing from the spirit of my invention or sacrificing its advantages.

Having fully described my invention, I claim as new and desire to secure by Letters Patent—

1. A machine for cutting butter and other substances into small cakes or blocks, consisting of a base-plate or support, an oblong casing mounted over one end thereof, and provided with a reduced extension, said casing being open at both ends, a receptacle mounted above the reduced extension of said casing, a roller mounted over said receptacle, a vertically-movable blade or cutter connected with said roller, a rack-bar mounted over said plate or support and provided with a piston which works in said casing, and means for operating said rack-bar and said cutter, consisting of a yoke pivotally supported below said plate or support, the sides of which are connected with said blade or cutter, a bearing or bearings at the side of said rack-bar, a shaft mounted therein, a gear-wheel mounted on said shaft and adapted to operate said rack-bar, a ratchet-wheel mounted on said shaft adjacent to said gear-wheel, a crank connected with said shaft and provided with a pawl which operates in connection with said ratchet-wheel, a crank-rod connected with said crank, and means for operating said crank-rod and said yoke, substantially as shown and described.

2. A machine for cutting butter and other substances into small blocks or cakes, comprising a base-plate or support, an oblong casing mounted over one end thereof, and provided with a reduced extension, a receptacle mounted above said extension, a roller mounted over said receptacle, a cloth wound on said roller, a cutting-blade connected with said cloth, a drum mounted on the shaft of said roller, a cord wound on said drum, and connected with a spiral spring which is adapted to hold the blade or cutter in its raised position, and means for operating the blade or cutter and for forcing the butter or other substance through said casing, substantially as shown and described.

In testimony that I claim the foregoing as my invention I have signed my name, in presence of the subscribing witnesses, this 10th day of April, 1897.

CHARLES T. COLBY.

Witnesses:
WESLEY POWELL,
M. STELL.